Figure 1:
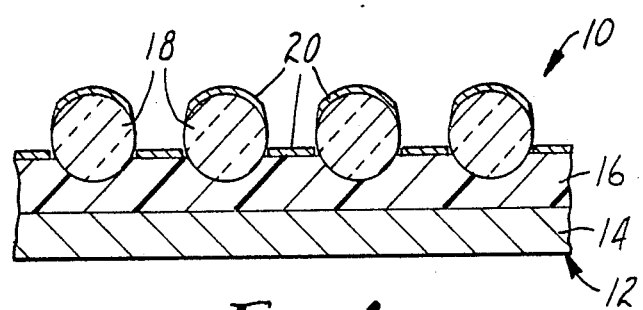

United States Patent [19]
Bailey et al.

[11] Patent Number: 4,897,136
[45] Date of Patent: * Jan. 30, 1990

[54] METHOD OF MAKING ENCAPSULATED-LENS RETROREFLECTIVE SHEETING

[75] Inventors: Terry R. Bailey, Woodbury; Roger R. Kult, Maplewood; Howard R. Tolliver, Woodbury; Arthur D. Dickson, St. Paul, all of Minn.

[73] Assignee: Minnesota Mining and Manufacturing Company, St. Paul, Minn.

[*] Notice: The portion of the term of this patent subsequent to May 12, 2004 has been disclaimed.

[21] Appl. No.: 89,944

[22] Filed: Aug. 26, 1987

Related U.S. Application Data

[63] Continuation of Ser. No. 799,098, Nov. 18, 1985, abandoned.

[51] Int. Cl.[4] .................. A63B 39/00; B29B 1/16; B32B 31/00
[52] U.S. Cl. .................. 156/145; 156/231; 156/241; 156/276; 156/298; 428/325
[58] Field of Search .......... 156/230, 234, 235, 238, 156/239, 240, 241, 247, 249, 276, 298, 244.11, 145, 244.12, 246, 292; 428/325, 344; 40/615, 616; 350/105

[56] References Cited

U.S. PATENT DOCUMENTS

| 2,407,680 | 9/1946 | Palmquist et al. | 40/208 |
| 3,005,382 | 10/1961 | Weber | 40/208 |
| 3,190,178 | 6/1965 | McKenzie | 40/615 |
| 4,075,049 | 2/1978 | Wood | 156/298 |
| 4,148,955 | 4/1979 | Breitenfellner et al. | 428/143 |
| 4,376,006 | 3/1983 | Nishikawa et al. | 156/241 |
| 4,394,416 | 6/1983 | Shimizu et al. | 156/241 |
| 4,505,967 | 3/1985 | Bailey | 156/296 |
| 4,605,461 | 8/1986 | Ogi | 156/241 |
| 4,664,966 | 5/1987 | Bailey et al. | 156/244.11 |
| 4,767,659 | 8/1988 | Bailey et al. | 156/244.11 |

Primary Examiner—Robert A. Dawson
Assistant Examiner—Louis Falasco
Attorney, Agent, or Firm—Donald M. Sell; Walter N. Kirn; Roger R. Tamte

[57] ABSTRACT

In encapsulated-lens reflective sheeting of the prior art, a monolayer of glass microspheres is embedded in a binder layer, a specularly reflective layer underlies the microspheres, and a cover film encapsulates the microspheres, within a plurality of hermetically sealed cells. In the invention, a HMW thermoplastic binder film, affords improved structural integrity, greater toughness, and better conformability to irregular surfaces without cracking. The cover film preferably is of the same polymer family as said binder film.

21 Claims, 2 Drawing Sheets

METHOD OF MAKING ENCAPSULATED-LENS RETROREFLECTIVE SHEETING

This is a continuation of application Ser. No. 799,098 filed Nov. 18, 1985, abandoned.

FIELD OF THE INVENTION

The invention concerns encapsulated-lens retroreflective sheeting of the type disclosed in U.S. Pat. No. 3,190,178 (McKenzie) having a binder layer in which a monolayer of lenses such as glass microspheres is partially embedded. A cover film is sealed to the binder layer such that the lenses are encapsulated within hermetically sealed cells. The invention particularly concerns an improved binder layer for such encapsulated-lens sheeting.

BACKGROUND ART

The earliest retroreflective sheeting had an exposed-lens construction, but its reflex-reflective light was blanked out when the lenticular surface of the exposed lenses was covered with water. This problem was answered by enclosed-lens retroreflective sheeting in which, as first taught in U.S. Pat. No. 2,407,680 (Palmquist et al.), the lenses were embedded within the sheeting which had a flat, transparent cover film. This allowed incident light rays to be focused onto the specularly reflective layer irrespective of whether the front of the sheeting was wet or dry. The above-cited McKenzie patent solved the same problem in a different way, namely, by modifying retroreflective sheeting of the exposed-lens type wherein lenses are partially embedded in a binder layer. In the McKenzie patent, the exposed lenses are protected by a cover film to which the binder layer is sealed along a network of interconnecting lines, thus forming a plurality of hermetically sealed cells within which the lenses are encapsulated and have an air interface. Such exposed-lens retroreflective sheeting is called "encapsulated-lens retroreflective sheeting".

In the method taught in the McKenzie patent for making encapsulated-lens retroreflective sheeting: (1) substantially a monolayer of lenses such as glass microspheres is embedded into a carrier web to a depth not exceeding 50% of the diameter of each microsphere, (2) specularly reflecting material is deposited over the lens-bearing surface of the carrier web, (3) a solution of binder material is applied over the specularly reflecting deposit, (4) after drying the binder, the carrier web is stripped off, (5) a cover film is laid over the exposed microspheres, and (6) heat and pressure are applied along a network of interconnecting lines to soften the binder material to allow it to flow around the microspheres and into contact with the cover film, thus forming the aforementioned hermetically sealed cells. It is believed that in the manufacture of all such encapsulated sheeting, the binder material includes a white pigment such as TiO$_2$ to give the sheeting a whiter color as well as a cleaner color in any area to which another color has been applied by silk screening. The whiteness of the sheeting is enhanced if the specularly reflective material, usually aluminum, between the microspheres is carried away by the carrier web. To this end, the binder material may include a release agent such as stearic acid, but a release agent tends to interfere with the bonds between the binder layer and both the glass microspheres and the cover film. Better structural integrity is needed for uses in which the retroreflective sheeting is to be subjected to flexing or abrasion, as in roadlane markers, or impact, as in traffic cones.

Figure 3:
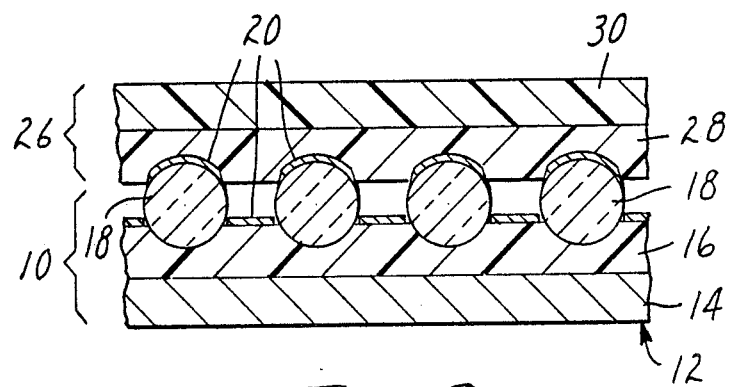
Figure 4:
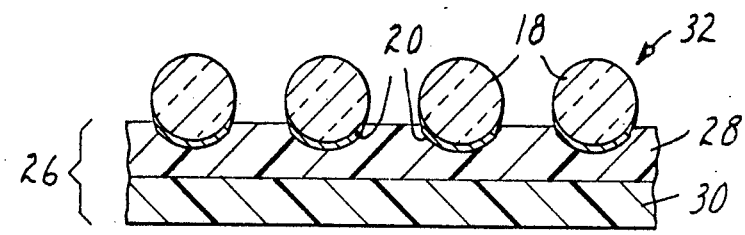

Another method for making encapsulated-lens retroreflective sheeting is taught in U.S. Pat. No. 4,075,049 (Wood). The first two steps of the Wood method are substantially the same as the first two steps of the McKenzie method, but in the third step of the Wood patent, some of the lenses 11a are forced into the carrier web 13 along a network of grid lines 18 as illustrated in FIGS. 3 and 4. Then a cast binder layer 23 is applied over the undisplaced lenses 11 such that some of the binder layer flows into the grid pattern between the undisplaced lenses (FIG. 5A). After the carrier web and the displaced spheres have been stripped off (FIG. 6) comparably to step (4) of the McKenzie patent, a flat, transparent cover film 27 is adhered to the binder layer at the grid pattern, between which the lenses are encapsulated and have an air interface 28 as shown in FIG. 7.

DISCLOSURE OF INVENTION

The invention provides encapsulated-lens retroreflective sheeting which can have better structural integrity than has been achievable in the prior art. Both the method by which the sheeting can be made and the sheeting itself are believed to be novel. The novel encapsulated-lens retroreflective sheeting of the invention can be made by the method of the McKenzie patent except that instead of applying the binder material from solution, the novel method uses a preformed binder film which is a tough, flexible, weather-resistant thermoplastic polymer of high molecular weight (here called a "HMW thermoplastic binder film", or more simply a "binder film") as evidenced by a melt index no greater than 750 (ASTM Test Method D1238-79). Typically the HMW thermoplastic resin has a weight average molecular weight from 60,000 to substantially more than 1,000,000. Such a polymer is extrudable, although with some difficulty when the melt index is about 750. Preferably the melt index of the binder film is less than 300, more preferably less than 150, because polymers of lower indices are easier to extrude and have better resistance to softening at elevated temperatures.

Best results in the practice of this invention are obtained when the HMW thermoplastic binder resin has a gradual change in viscosity over a wide range of temperatures as taught in U.S. Pat. No. 4,505,967 (Bailey) at col. 8, lines 16–59 and FIG. 6. As taught there, representative resins having such a gradual change in viscosity exhibit a less-than-order-of-magnitude reduction in loss modulus, measured in dynes per square centimeter, when the resins are heated over a 50-degree-centigrade temperature interval within the softening range of the material.

Briefly, the encapsulated-lens retroreflective sheeting of the invention, like those of the McKenzie and Wood patents, comprises a binder layer in which substantially a monolayer of lenses such as glass microspheres is partially embedded, a specularly reflective layer underlying the microspheres, and a cover film sealed to the binder layer along a network of interconnecting lines forming hermetically sealed cells within which the lenses are encapsulated and have an air interface. The novel retroreflective sheeting differs from those of the McKenzie and Wood patents in that the binder layer is a HMW thermoplastic binder film which affords to the retroreflective sheeting improved structural integrity, greater toughness, and better conformability to irregular surfaces without cracking.

The melt viscosity of the HMW thermoplastic binder film is quite high compared to the solvent-cast binders which have been used in encapsulated-lens sheeting such as in examples of the McKenzie patent. While this should make ho difference in the resulting encapsulated-lens sheeting when using a hard transparent cover film, as do the examples of the McKenzie patent, there may be a difference when using a cover film which is relatively soft at its inner-facing surface, especially when heated. If so, microspheres may partially penetrate the inner surface of the cover film before the HMW thermoplastic binder film can fully envelope them. In such event, it is well to select the cover film so that good adhesion develops between the microspheres and the cover film.

For reasons mentioned above in discussing the McKenzie patent, the binder film may include a white opacifying agent such as a white pigment. The whiteness can be enhanced by a dual-layer (e.g., coextruded) binder film wherein the layer which contacts the lenses is relatively thin and has a greater proportion of white pigment and a higher melt index to enhance flow around the lenses. For such a dual-layer binder film, the polymer selected for the lens-contacting layer should afford especially good adhesion to the lenses, and the polymer selected for the other relatively thick layer should afford especially good toughness and flexibility.

Briefly, the novel retroreflective sheeting can be made as follows:

(1) partially embed substantially a monolayer of lenses into a carrier web,
(2) deposit specularly reflecting material over the lens-bearing surface of the carrier web,
(3) under heat and pressure, contact with a HMW thermoplastic binder film portions of the specularly reflecting deposit which are on microspheres without contacting any portion of the specularly reflecting deposit which is on the surface of the carrier web between lenses,
(4) strip off the carrier web,
(5) lay a cover film over the exposed lenses, and
(6) apply heat and pressure along a network of interconnecting lines to soften and deform the binder material into contact with the cover film, thus forming hermetically sealed cells within which the lenses are encapsulated and have an air interface.

The lenses preferably are glass microspheres, and the diameter of each of the glass microspheres preferably is from 50 to 200 micrometers. At a preferred average microsphere diameter of about 65 micrometers, the thickness of the binder film should be at least 25 micrometers, preferably at least 50 micrometers so that the bases of the microspheres remain fully covered by the binder layer in the foregoing 6-step method. This also provides sufficient binder film to flow around the microspheres in the sealed areas. More than 150 micrometers may be uneconomical.

Because the binder film does not contact portions of the specularly reflecting deposit between the lenses, the carrier web, when stripped off in step (4) of the above 6-step method, removes those portions of the deposit, thus leaving areas of the binder film between the lenses completely free from the specularly reflective material and its unwanted color.

Preferably the binder film is extruded rather than cast from solution, thus avoiding the solvent cost and possible pollution from driving off the solvent. Furthermore, extrusion permits faster production rates as compared to the time delay in drying a solvent-cast film. An extruded binder film can either be extruded directly onto the specularly reflecting deposit on the microsphere-bearing surface of the carrier web, or it can be preformed and then reheated in step (3). The binder film should be supported by a dimensionally stable sheet such as biaxially oriented poly(ethylene terephthalate) film, preferably at least 12 micrometers in thickness to permit it to be stripped readily from the finished encapsulated-lens retroreflective sheeting. At thicknesses above about 50 micrometers, it may interfere with the formation of well-defined cells in step (6).

Between steps (4) and (5) may be an added step of pressing the exposed lenses into the binder film. When the lenses are glass microspheres, they may be pressed to a depth as great as about 95% of the microsphere diameter, preferably while applying heat. This mechanically locks the microspheres into the binder film, which is especially important for uses requiring stretching during application (e.g., to a cone) or involving repeated flexing (e.g., reflective highway lane markers). Depths exceeding 50% of the microsphere diameter result in some sacrifice in brilliance and limited angularity, but the mechanical locking obtained, especially with embedding of 60 or 75% or more, outbalances such a sacrifice.

The novel retroreflective sheeting could also be made by the method of the Wood patent except using a HMW thermoplastic binder film. However, it would be difficult to form a strong bond between the HMW thermoplastic binder film and a cover film except by selectively applying pressure to the grid network. It is questioned whether such pressure could be accurately applied at commercially useful rates.

To enhance adhesion of the binder film to the inner surface of the cover film, the cover film at that surface preferably is highly compatible with and thus has great affinity to the binder film at useful sealing temperatures, and more preferably is of the same polymer family. Such materials tend to have greater toughness, flexibility, and extensibility than do materials which have been used in the prior art for transparent cover films. On the other hand, those materials may have less resistance to weathering and dirt accumulation, in which event the transparent cover film may be multi-layer, the outer layer of which provides good resistance to weathering and dirt accumulation.

Best results have been achieved when the HMW thermoplastic binder film has been selected from (a) aliphatic urethane polymer or (b) a copolymer of monomers comprising by weight a major proportion of at least one of ethylene and propylene and a minor proportion of another monomer. Those HMW thermoplastic binder films can be expected to afford the elongation required to permit the retroreflective sheeting to stretch sufficiently to be applied to a traffic cone or to irregular surfaces such as sidewalls of various automotive vehicles. Good stretchability also is required when the novel retroreflective sheeting is to be embossed, e.g., when mounted on a license plate blank. To permit the blank to be embossed in a male/female die to a depth of 2.5 mm with no danger of cracking, the elongation of the HMW thermoplastic binder film should be at least 100%, preferably at least 200%. Good stretchability is also required for use of the novel retroreflective sheeting in flexible traffic markers which must withstand repeated flexing under the tires of automotive vehicles.

A preferred aliphatic urethane polymer is prepared from an aliphatic polyfunctional isocyanate and a polyfunctional hydroxyl-containing polymer, e.g., "Q-thane" P3429 of K. J. Quinn & Co., Inc. Among other preferred HMW thermoplastic binder films are ethylene copolymers, a number of which are commercially available at reasonable cost, including

| Supplier | Designation | Comonomer | Melt Weight % | Index |
|---|---|---|---|---|
| Dow Chemical | "Primacor" 3460 | acrylic acid | 9 | 20 |
| E. I. duPont | "Elvax II" 5720 | methacrylic acid | 11 | 100 |
| E. I. duPont | "Elvax" 230 | vinyl acetate | 28 | 110 |

Each of these polymers has excellent flexibility at temperatures as low as $-4020$ C. and also has good adhesion to glass microspheres, both with and without a specularly reflective metal coating. Other thermoplastic binder films which may be useful include polyesters, especially copolyesters of a glycol and two or more acids.

A preferred encapsulated-lens retroreflective sheeting of the invention employs an ethylene copolymer as the HMW thermoplastic binder film and employs a cover film which also is an ethylene copolymer. Such a cover film is tough and has good resistance to impact, abrasion, solvents, moisture, and weathering. It also is relatively inexpensive. An espcially preferred cover film is multi-layer, the outer layer being an ionomeric ethylene copolymer and the inner layer being a nonionomeric ethylene copolymer. The ionomeric outer layer provides improved resistances to softening at elevated temperatures that may be encountered in use and also improved resistance to dirt accumulation. While it hasn't been established, an ionomeric ethylene copolymer may provide better resistance to weathering.

When the HMW thermoplastic binder film is an aliphatic urethane polymer, at least the inner layer of the cover film preferably also is an aliphatic urethane polymer. It is exceedingly tough and resistant to impact and abrasion, but preferably is covered with a very thin film comprising an acrylic copolymer of monomers including methyl methacrylate and another acrylate or methacrylate wherein methyl methacrylate comprises at least 20%, but not more than 90%, by weight of those monomers.

It may be desirable to form the HMW thermoplastic binder film from two or more polymers, because a blend of polymers often provides greater toughness and flexibility than would either polymer by itself. One of the polymers may be selected to enhance adhesion to the cover film and possibly also to the lenses.

THE DRAWING

Figure 2:
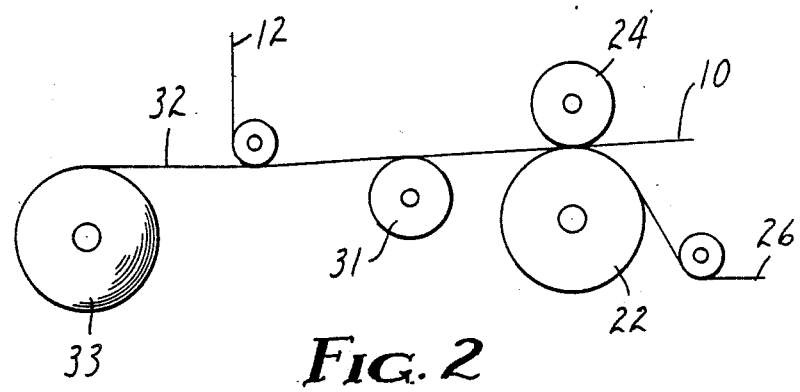
Figure 5:
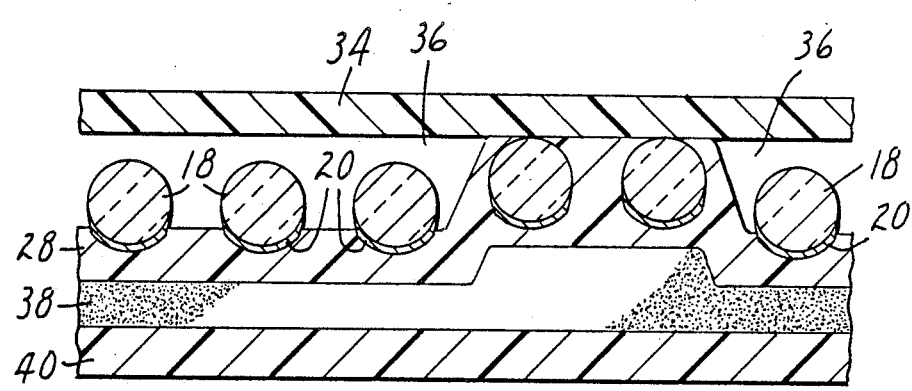

In the drawing, all figures of which are schematic:
FIG. 1 is a cross section through a sheet in an early stage of a preferred method of the invention;
FIG. 2 illustrates a subsequent step of the preferred method of the invention;
FIG. 3 is a cross section along line 3—3 of FIG. 2;
FIG. 4 is a cross section through a sheet at a later stage of the preferred method of the invention; and
FIG. 5 is a cross section through encapsulated-lens retroreflective sheeting of the invention.

The sheet 10 shown in FIG. 1 comprises a carrier web 12 which is a composite of paper carrier 14 and polyethylene film 16. A plurality of glass microspheres 18 have been embedded to about 25% of their diameter into the polyethylene film while applying heat sufficient to enable each microsphere to fit snugly into the polyethylene. A thin-film layer 20 of aluminum has been vapor-deposited onto the microspheres 18 and onto the surface of the polyethylene film between the microspheres. While being vapor deposited, the aluminum vapors strike the microsphere-bearing surface of the carrie web 12 substantially orthogonally, thus leaving substantially free from aluminum the areas of the polyethylene surface lying immediately beneath a microsphere.

In FIG. 2, the sheet 10 is shown being passed between a hot can 22 and a soft pressure roll 24 together with a laminate 26 (FIG. 3) of a HMW thermoplastic binder film 28 and a support 30 which is biaxially oriented poly(ethylene terephthalate) film (PET). The heat and pressure between the roller 22 and pressure roll 24 partially embed the microspheres 18 into the binder film 28 as shown in FIG. 3 but not to the extent that there is any contact between the binder film 28 and the portion of the aluminum layer 20 between the microspheres. After contact with a cooling roll 31, the carrier web 12 is stripped off, leaving the sheet 32 shown in FIG. 4 which is wound upon itself to provide a roll 33.

After unwinding the roll, a transparent cover film 34 (FIG. 5) which is resistant to weather and dirt is then laid over the exposed microspheres of the sheet 32, and heat and pressure are applied along a network of lines as taught in the McKenzie patent, thus softening and deforming the binder film 28 into contact with the cover film. This forms a plurality of hermetically sealed cells 36 within which the microspheres 18 are encapsulated and have an air interface. The PET support 30 may then be stripped away, and an adhesive layer 38 applied in its place. Preferably the adhesive is a pressure-sensitive adhesive and is protected by a low-adhesion liner 40 that may be peeled off to expose the adhesive layer by which the resulting encapsulated-lens retroreflective sheeting may be adhered to a substrate such as a signboard.

As illustrated in FIGS. 4 and 5, each of the glass microspheres 18 is normally embedded into the binder film 28 only to about 10-30% of its diameter. However, by applying heat and pressure to the exposed microspheres of the sheeting 32 shown in FIG. 4, each microsphere may be embedded into the binder film 28 to a depth as great as about 95% of its diameter, thus securely locking each microsphere into the binder film to keep it from being dislodged when the product encapsulated-lens retroreflective sheeting is stretched and/or repeatedly flexed.

Testing

The following tests may be used to evaluate encapsulated-lens retroreflective sheeting.

Seal Strength

A 2.54-cm strip of encapsulated-lens sheeting is adhered by its adhesive layer to a rigid aluminum panel. A 2.54-cm tape is adhered to the transparent cover film. A sharp razor blade is then used to separate one end of the cover film from the binder film. Using an Instron Tensile testing device, the separated cover film is placed in the upper jaw while the aluminum panel is held in place by a jig attached to the lower jaw. The jig allows the cover film to be pulled away at 90° from the binder layer. This measures the force required to delaminate the cover film from the microsphere-bearing binder film.

Tensile and Elongation

ASTM Test Method D882-80a in the down web direction.

Retroreflective Measurements

Retroreflective Intensity is measured using a retroluminometer as described in U.S. defensive publication No. T987,003 at a 0.2° divergence angle and entrance angles of −4° and +40°. The Half Brightness Angle (HBA) is the entrance angle at which the retroreflective sample attains ½ of its original −4° Retroreflective Intensity.

Stretch-Flex

This test measures the retention of Reflective Intensity at 0.2° divergence angle and −4° entrance angle when the encapsulated reflective sheeting undergoes a combination of stretching and bending or flexing. At ordinary room temperature, a sample of the sheeting (101.6×76.2 mm with or without any adhesive) is stretched lengthwise either 25% or 50%, is held in this stretched state, and then sharply passed over a 90° bend at 90 mm/min with the bead binder layer against the 90° bend.

CAP Y

CAP Y is a colormetric measurement of overall sheeting whiteness. This value is measured using a Hunter spectrophotometer.

Optical Transmittance

ASTM D1746-70.

In the following examples, all parts are by weight.

EXAMPLE 1

Glass beads or microspheres having an average diameter of about 65 micrometers and a refractive index of 1.91 were flooded onto a polyethylene-paper carrier web which had been heated to about 105° C. Substantially a monolayer of the beads adhered to the polyethylene, and the excess fell off the web. The glass-bead coated polyethylene paper was then heated in an oven at about 140° C. to soften the polyethylene so that the glass beads were drawn into the polyethylene to about 30% of their diameter by gravity and capillary forces.

In a vacuum chamber, aluminum was deposited over the monolayer of glass beads to a thickness of about 100 nm.

Onto a 20-micrometer PET support film was extruded a HMW thermoplastic binder film formed from a mixture of pellets of which 69.0 parts were a polyethylene/methacrylic acid (EMAA) copolymer and 31.0 parts were a concentrate consisting of 11.9 parts of a polyethylene/vinyl acetate (EVA) copolymer, 18.0 parts of rutile titanium dioxide white pigment, and 1.1 parts of a weathering stabilizer system which in turn consisted of 1 part hindered amine light stabilizer and 0.1 part of antioxidant. The EMMA copolymer had a melt flow index of 100 and was understood to be a copolymer of 89 parts polyethylene and 11 parts methacrylic acid ("Elvax II" 5720 of E. I. duPont de Nemours & Co.). The EVA copolymer had a melt flow index of 110 and was understood to be a copolymer of 72 parts polyethylene and 28 parts vinyl acetate ("Elvax" 230). The extruder had a diameter of 4.4 cm and a length/diameter ratio of 30:1. The extruder temperature profile (from hopper end to die) was set at 77°, 204°, 149°, 121° C. The polymer transfer tube was set at 132° C., while the film die was set at 143° C. Extruder screw speed was adjusted to 26 rpm while the film takeaway was adjusted to 12.2 m/min. to provide a binder film thickness of about 50 micrometers.

Using apparatus as shown in FIG. 2, the beadmonolayer of the polyethylene-paper carrier web was contacted by the binder film carried by the PET support film while the hot can was at 104° C. and the applied pressure was 31.6 kg/cm width at a line speed of 6 m/min. This pressed the glass beads into the binder film to a depth approximately 20% of their diameter. After peeling off the carrier web, the remaining laminate was wound upon itself as shown in FIG. 2.

Examination under a microscope of the stripped carrier web and the bead-transferred binder film showed that 99% of the beads had transferred to the binder film while nearly 100% of the aluminum vapor coat between the beads remained behind on the carrier web.

A transparent cover film comprising 98.85 parts ionomeric ethylene copolymer, 0.75 part U.V. absorber, 0.3 part hindered amine light stabilizer, and 0.1 part antioxidant was extruded onto another PET support film using the same 4.5-cm extruder. The ionomeric ethylene copolymer had a melt flow index of 0.7 and was understood to be a thermoplastic polymer which contains interchain ionic bonds based on a zinc salt of ethylene methacrylic acid copolymer ("Surlyn" 1706 of E. I. duPont de Nemours & Co ). A temperature profile for the extruder from hopper end to die was set at 243° C., 254° C., 227° C. and 210° C. while the die was set at 241° C. The extruder screw speed and film takeaway speed were adjusted to provide a transparent cover film having a thickness of about 100 micrometers and an Optical Transmittance of about 89%.

This transparent cover film was sealed to the beadbearing surface of the binder film along a network of interconnecting lines as taught in the above-cited McKenzie patent under the following conditions:

Surface temperature of embossing can: 174° C.,

Embossing speed: 3 m/min,

Nip roll pressure: 21.2 kg/cm width, thus encapsulating the glass beads in hexagonal cells about 3 mm across and a seal width of about 0.5 mm. After stripping off both PET support films, a pressure-sensitive adhesive layer carried by a protective liner was laminated to the exposed surface of the binder film, thus providing encapsulated-lens retroreflective sheeting as illustrated in FIG. 5.

EXAMPLE 2

Encapsulated-lens retroreflective sheeting was made as in Example 1 except that instead of the single-layer cover film of Example 1, a dual-layer cover film was prepared as described below.

Layer A contained 96.45 parts of a copolymer of 91% polyethylene and 9% acrylic acid (EAA) having a melt index of 3.0 ("Primacor" 1420 of Dow Chemical Co.), 2.0 parts U.V. absorber, 1.5 parts of hindered amine light stabilizer, and 0.05 parts of antioxidant. Layer B contained 96.45 parts of ionomeric ethylene copolymer ("Surlyn" 1706) and the same amounts of the same three additives used in Layer A. A 6.4-cm extruder (L:D=30:1) was used for Layer A, and a 3.2-cm extruder (L:D=30:1) was used for Layer B. The temperature profile for the 6.4 cm extruder was 210° C., 290° C., 297° C. 283° C. and 284° C. while the temperature profile for 3.2-cm extruder was 229° C., 253° C., 239° C. and 219° C. The two layers were co-extruded through a 86-cm multi-manifold die at a face temperature of 280° C. with end plates at 305° C. Extruder screw speeds and film takeaway speed were adjusted to produce a dual-layer transparent cover film having a thickness of 100 micrometers with a thickness ratio of A:B=3:1. Optical transmission of the dual-layer cover film was about 88%.

Layer A of the dual-layer cover film was sealed to the bead-bearing binder film under the following conditions:
Surface temperature of embossing can: 174° C.
Embossing speed: 5 m/min.
Nip roll pressure: 21.1 kg/cm width

EXAMPLE 3

Encapsulated-lens retroreflective sheeting was made as in Example 1 except as indicated below:

The HMW thermoplastic binder film consisted of a mixture of 70 parts of a copolymer of 91% ethylene and 9% acrylic acid (EAA) having a melt index 10.0 ("Primacor" 3440), 12 parts of the EVA copolymer used in Example 1, and 18 parts rutile titanium dioxide white pigment. Temperature profile for the extruder was set at 171°, 182°, 160° and 160° C. while the die was set at 99° C. Extruder screw speed and film takeaway speed were adjusted to provide a binder film thickness of approximately 75 micrometers.

Conditions for developing the bead-transferred binder film were:
hot can: 102° C.
nip roll pressure: 31.6 kg/cm width
line speed: 6 m/min.

A transparent cover film identical to that used in Example 1 was sealed to the bead-bearing surface of the binder film in the same manner as in Example 1 except under the following conditions:
Surface temperature of embossing can: 216° C.
Embossing speed: 4.5 m/min
Nip roll pressure: 23.8 kg/cm width

EXAMPLES 4, 5 AND 6

Encapsulated-lens retroreflective sheetings were made as in Example 1 except as indicated below.

The HMW binder film consisted of 82 parts of a thermoplastic aliphatic urethane polymer believed to be the reaction product of 1,1-methylene bis(4-isocyanatocyclohexane), adipic acid, isophthalic acid, and 1,4-butane diol ("Q-thane" P3429 made by K. J. Quinn and Co. Inc.), and 18 parts rutile titanium dioxide. Binder film was extruded onto a duplex support film consisting of 12.5 micrometer low-density polyethylene (LDPE) and 12.5-micrometer PET. Prior to being extruded, the materials had been dried to remove excess moisture content in a dehumidification type dryer at 66° C. for 16 hours. Extrusion conditions for the binder film were 171° C., 193° C., 210° C. and 216° C. Extrusion die end plates were set at 204° C. while the body of the die was set at 193° C. Extruder screw speed and film takeaway speed were adjusted to provide a binder film about 50 micrometers in thickness.

Conditions for developing the bead-trasferred binder film were:
hot can: 110° C.
nip roll pressure: 25.2 kg/cm width
line speed: 32 m/min.

Heat and pressure were applied to the bead-bearing surface of two portions of this bead-bearing binder film in order to enhance the bead bond to the binder film, thus reducing the danger that the beads might be dislodged in use. Those two portions were used in making enclosed-lens retroreflective sheeting of Examples 5 and 6, respectively, while an unmodified portion was used in making that of Example 4. Bead-sink conditions were:

| For binder film of: | Example 4 | Example 5 | Example 6 |
|---|---|---|---|
| Applied Temperature | — | 152° C. | 152° C. |
| Applied pressure (kg/cm width) | — | 25.2 | 25.2 |
| Line speed | — | 4.6 m/min | 1.0 m/min |
| Approximate depth of beads in binder | 20 | 50% | 85% |

A transparent cover film was extruded using the 4.4-cm extruder and the thermplastic aliphatic urethane polymer used in making the HMW binder film. Extrusion conditions were 171° C., 182° C., 188° C. and 193° C. The die end plates were set at 199° C. while the body of the die was set at 193° C. Screw speed and film takeaway speed were adjusted to provide a thickness of approximately 100 micrometers. Optical Transmittance of the resulting cover film averaged 86%.

Pieces of the transparent cover film were sealed to the binder films under the following conditions.

|  | Example 4 | Example 5 | Example 6 |
|---|---|---|---|
| Embossing can surface temperature | 168° C. | 168° C. | 168° C. |
| Line speed (m/min) | 4.6 | 4.6 | 4.1 |
| Nip roll pressure (kg/cm width) | 19.5 | 19.5 | 19.5 |

Properties of the encapsulated-lens retroreflective sheetings of Examples 1–6 were:

|  | Example | | | | | |
|---|---|---|---|---|---|---|
|  | 1 | 2 | 3 | 4 | 5 | 6 |
| Seal width (mm) | 0.56 | 0.46 | 0.48 | 0.25 | 0.25 | 0.3 |
| Seal strength (g/cm width) | 1150 | 1150 | 550 | 1250 | 1600 | 2150 |
| Tensile strength at break (MPa) | 15.5 | 10.0 | 12.6 | 28.2 | 31.6 | 29.9 |
| Elongation (%) | 300 | 390 | 380 | 430 | 450 | 440 |
| Retroreflectivity at −4° (cancellas per lumen) | 270 | 260 | 260 | 300 | 290 | 310 |
| Retroreflectivity at +40° (candellas per lumen) | — | — | — | 390 | 395 | 190 |
| HBA | — | — | — | 56° | 54° | 42° |
| Stretch-flex (%) at 25% | — | — | — | 47 | 97 | 98 |
| Stretch-flex (%) at 50% | — | — | — | 31 | 74 | 97 |
| CAP Y | — | — | — | 21.6 | 24.7 | 28.2 |

We claim:

1. Method of making encapsulated-lens retroreflective sheeting which comprises the following steps:
   (1) partially embed substantially a monolayer of lenses into a carrier web,
   (2) deposit specularly reflecting material over the lens-bearing surface of the carrier web,
   (3) under heat and pressure, contact with a HMW thermoplastic binder film portions of the specularly reflecting deposit which are on lenses without contacting any portion of the specularly reflecting deposit which is on the surface of the carrier web between lenses,
   (4) strip off the carrier web to form exposed leases,
   (5) lay a cover film over the exposed lenses, and
   (6) apply heat and pressure along a network of interconnecting lines to soften and deform the binder material into contact with the cover film, thus forming hermetically sealed cells within which the lenses are encapsulated and have an air interface.

2. Method as defined in claim 1 wherein the weight average molecular weight of the HMW thermoplastic binder film is at least 60,000.

3. Method as defined in claim 1 wherein the melt index of the binder film is less than 300.

4. Method as defined in claim 2 including a step prior to step (3) of extruding the binder film.

5. Method as defined in claim 1 wherein the HMW thermoplastic binder film includes a white pigment.

6. Method as defined in claim 5 wherein the white pigment is $TiO_2$.

7. Method as defined in claim 1 wherein the lenses are glass microspheres.

8. Method as defined in claim 1 wherein prior to step (3) the HMW thermoplastic binder film is extruded onto a flexible, dimensionally stable film to provide a dimensionally stable laminate.

9. Method as defined in claim 8 wherein the cover film comprises a HMW thermoplastic resin which is compatible with the aforesaid HMW thermoplastic binder film.

10. Method as defined in claim 1 including the step of pressing the microspheres deeper into the binder film after removal of the carrier web.

11. Method as defined in claim 10 in which the microspheres are embedded on the average to at least 75% of their diameter.

12. Method as defined in claim 1 in which the HMW thermoplastic binder comprises a copolymer of monomers comprising by weight a major proportion of at least one of ethylene and propylene and a major proportion of another monomer.

13. Method as defined in claim 1 wherein the HMW thermoplastic binder film comprises an ethylene copolymer and the cover film also comprises an ethylene copolymer.

14. Method as defined in claim 1 wherein the thermoplastic binder film comprises a polymer that exhibits a less-than-order-of-magnitude reduction in loss modulus measured in dynes per square centimeter over a 50-degree-Centigrade temperature interval within the softening range of the polymer.

15. Method as defined in claim 1 wherein the cover film comprises an ionomeric ethylene copolymer.

16. Method as defined in claim 1 wherein said second application of heat and pressure is applied by using an embossing roll having a raised area corresponding to the network of interconnecting lines in which said heat and pressure is applied.

17. Method as defined in claim 1 in which the HMW thermoplastic binder film comprises a urethane polymer.

18. Method as defined in claim 2 wherein the melt index of the binder material is less than 300.

19. Method as defined in claim 3 including a step prior to step (3) of extruding the binder material.

20. Method as defined in claim 2 wherein the thermoplastic binder film comprises a polymer that exhibits a less-than-order-of-magnitude reduction in loss modulus measured in dynes per square centimeter over a 50-degree-Centigrade temperature interval within the softening range of the polymer.

21. Method as defined in claim 3 wherein the thermoplastic binder film comprises a polymer that exhibits a less-than-order-of-magnitude reduction in loss modulus measured in dynes per square centimeter over a 50-degree-Centigrade temperature interval within the softening range of the polymer.

* * * * *